United States Patent Office.

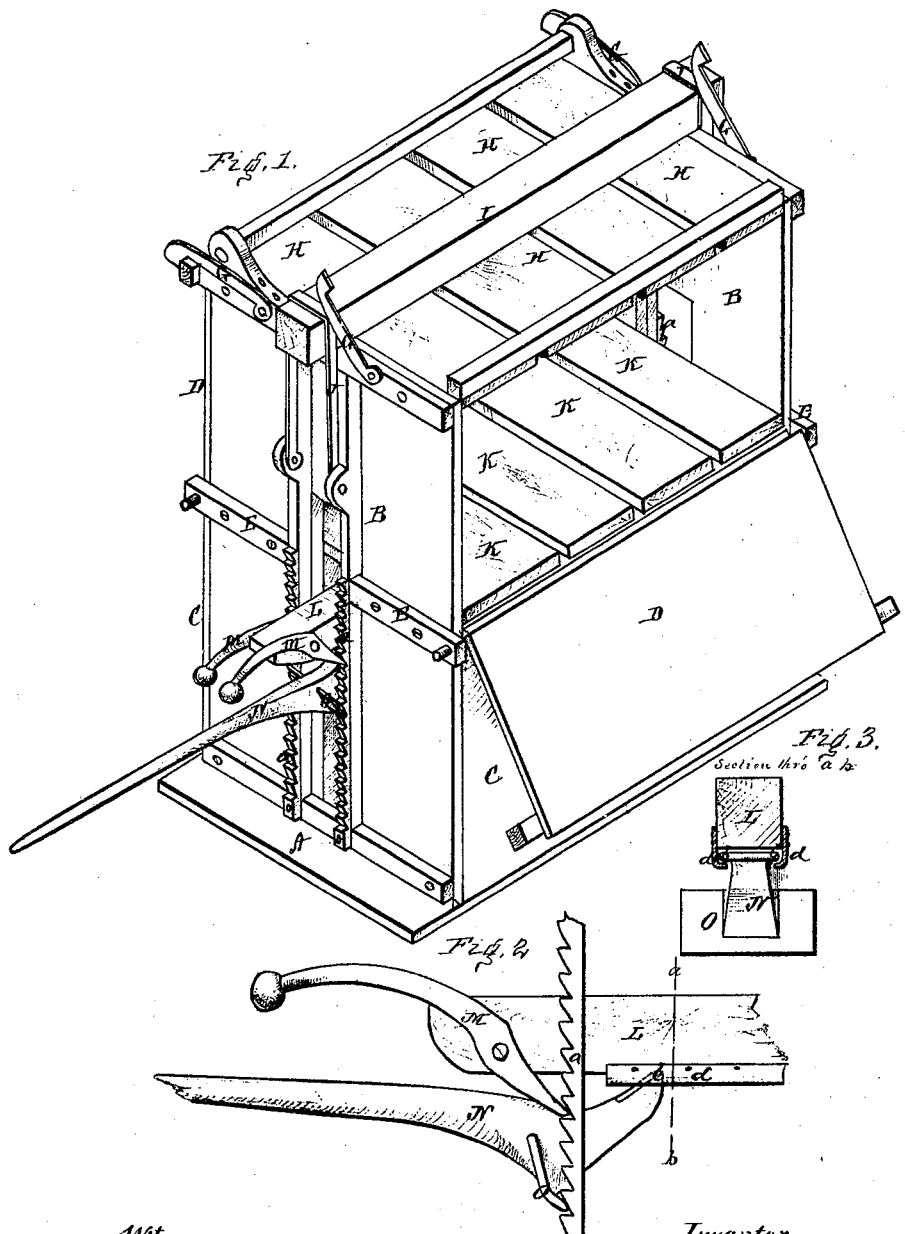

HENRY C. HUNT, OF INDIANAPOLIS, INDIANA.

Letters Patent No. 109,905, dated December 6, 1870.

IMPROVEMENT IN HAY-PRESSES.

The Schedule referred to in these Letters Patent and making part of the same.

*To all whom it may concern:*

Be it known that I, HENRY C. HUNT, of Indianapolis, in the county of Marion and in the State of Indiana, have invented certain new and useful Improvements in Hay-Presses; and do hereby declare that the following is a full, clear, and exact description thereof, reference being had to the accompanying drawing and to the letters of reference marked thereon making a part of this specification.

The nature of my invention consists in the construction and arrangement of a "portable baling-press," as will be hereinafter fully set forth.

In order to enable others skilled in the art to which my invention appertains to make and use the same, I will now proceed to describe its construction and operation, referring to the annexed drawing, in which—

Figure 1 is a perspective view of my press;

Figure 2 is an enlarged side view of the mechanism for raising the follower; and Figure 3 is a vertical section through line $a\,b$, fig. 2.

A represents the bed or base of my press, upon which are secured two end-pieces, B B, a suitable distance apart.

These end-pieces are connected for about their lower half by sides C C, and at the upper edges of said sides in arms E E, are pivoted doors D D, which close the upper half of the space between the end-pieces, said doors being fastened by hooks G G, as shown in fig. 1.

The top H is formed of a series of slats attached a suitable distance from each other to the under side of a central beam, I, which rests upon the upper edges of the end-pieces B B.

The ends of the slats forming the top H are also connected by bars, as shown, one of which is pivoted in ears upon the end pieces, thus hinging the top to the same.

The top H is fastened down by means of bails J J, pivoted to the outer sides of the end pieces B and fitting over the ends of the central beam I.

The end-pieces B B are slotted vertically in the center, and rack-bars $a\,a$ placed one on each side of said slot, as shown in fig. 1.

The follower of the press is constructed precisely in the same manner as the top H, except that the slats K K forming said follower are secured on top of a central beam, L, the ends of which project through the slots in the end pieces B B.

On the sides of the projecting ends of the central beam L are pivoted dogs M M, the outer ends of which are made heavier, so as to force the inner ends against and into the rack-bars $a\,a$, thus supporting the follower K L.

The follower is raised to compress the hay or cotton placed on the top thereof, in the following manner and by the following means:

A lever, N, the front end of which is constructed in the peculiar manner shown in fig. 2, is used for this purpose.

At the front end this lever is provided with pins $b\,b$, projecting from its sides, which pins are inserted in grooves or guides $d\,d$ formed on the under side of the central beam L.

The lever is also on its under side provided with a bent metal cross-bar, O, to catch in the rack-bars $a\,a$.

The manner of operating said lever to raise the follower is clearly illustrated in fig. 2.

When the bale is pressed and tied, it is readily removed by turning down the doors D D and throwing up the top H.

Having thus fully described my invention,

What I claim as new, and desire to secure by Letters Patent, is—

1. The combination of the rack-bars $a\,a$, dogs M M, and lever N, provided with pins $b\,b$ and bar O, substantially as and for the purposes herein set forth.

2. The combination of the bale-box A B C with its doors D D and top H I, the follower K L with dogs M M and guides $d\,d$, and the lever N with pins $b\,b$ and metal bar O, all substantially as and for the purposes herein set forth.

In testimony that I claim the foregoing, I have hereunto set my hand this 10th day of March, 1870.

H. C. HUNT.

Witnesses:
J. McLEUE,
D. BRADEN.